Jan. 21, 1936.  C. H. LAND ET AL  2,028,400
TRACTOR TRAILER VEHICLE
Filed April 15, 1935   4 Sheets-Sheet 1
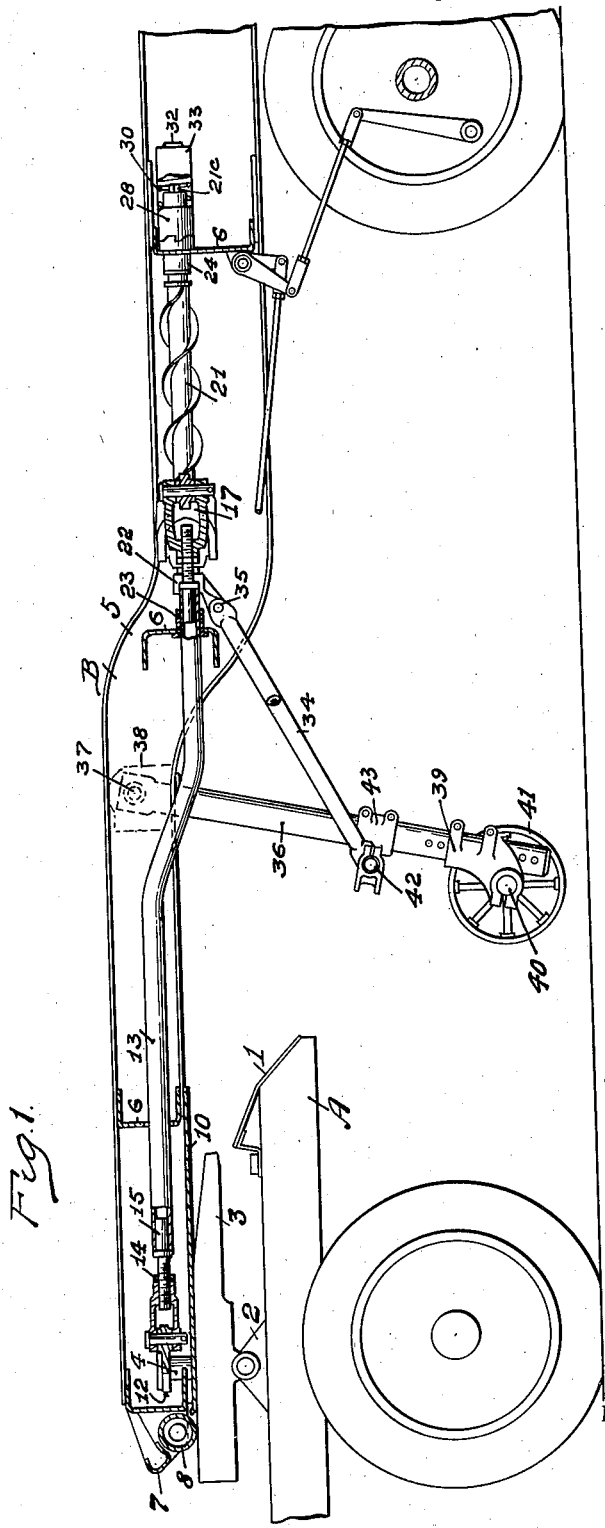
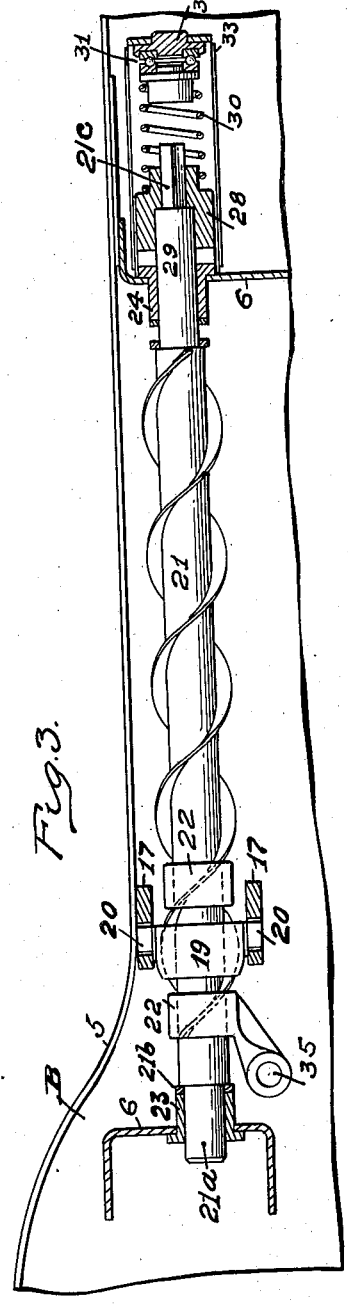
INVENTORS
Charles H. Land
and William H. Wilson
BY
S. E. Thomas
ATTORNEY.

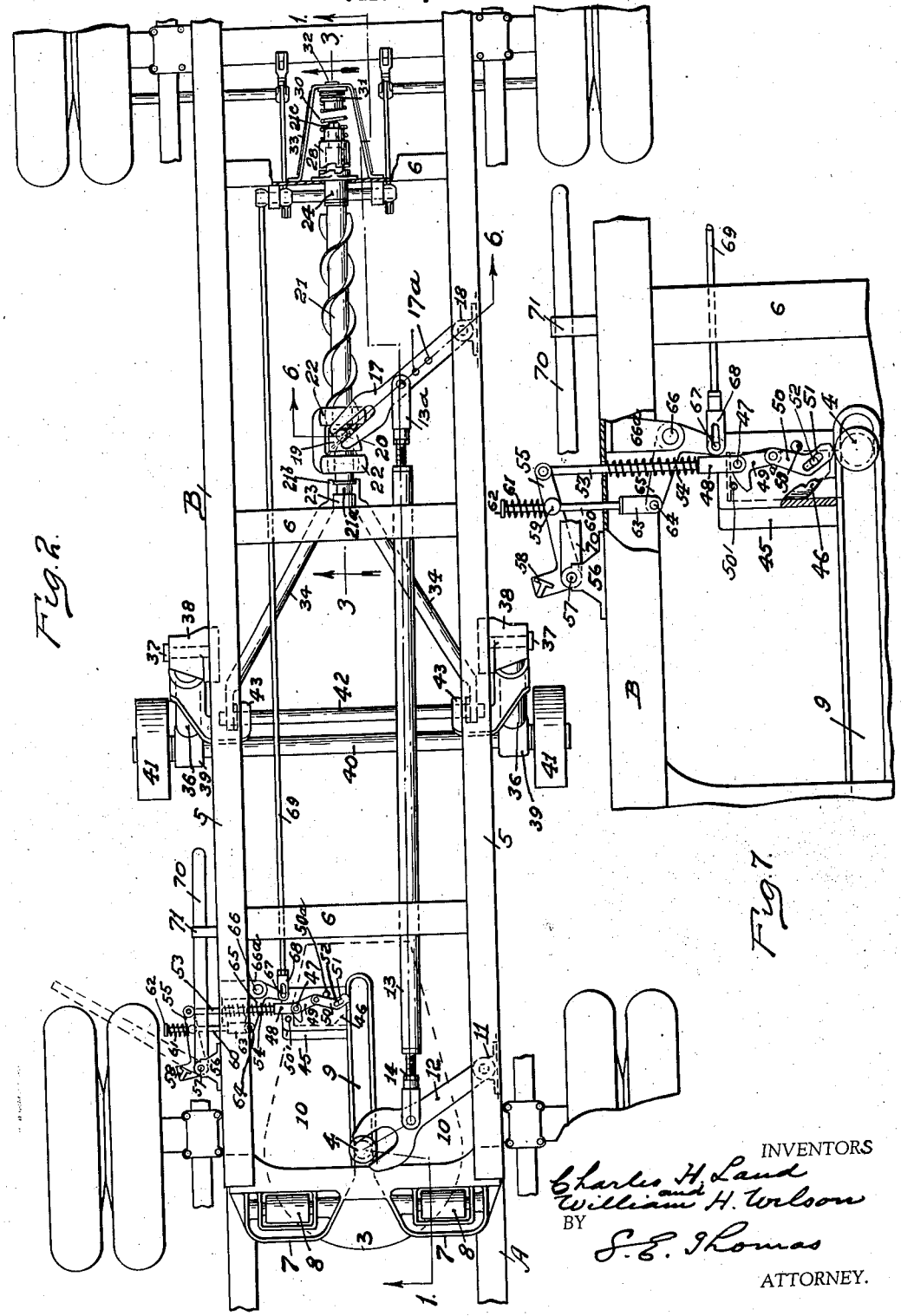

Jan. 21, 1936. C. H. LAND ET AL 2,028,400
TRACTOR TRAILER VEHICLE
Filed April 15, 1935 4 Sheets-Sheet 3
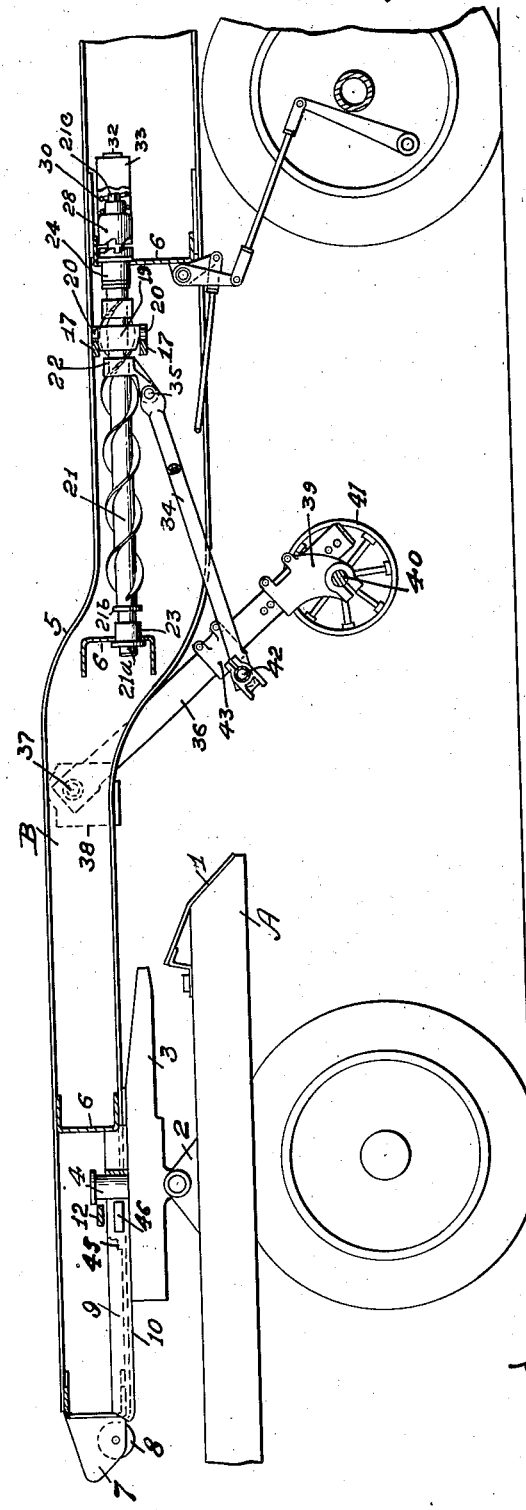
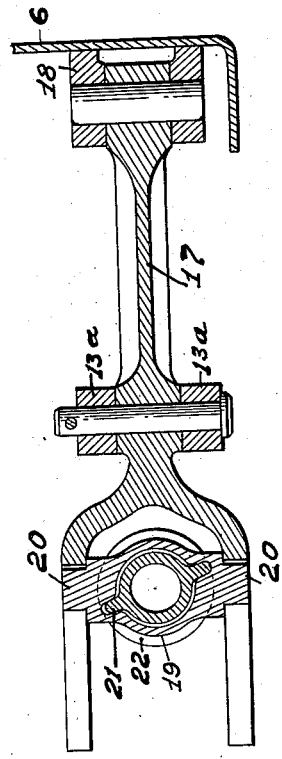
INVENTORS
Charles H. Land
William H. Wilson
BY
J. E. Thomas
ATTORNEY.

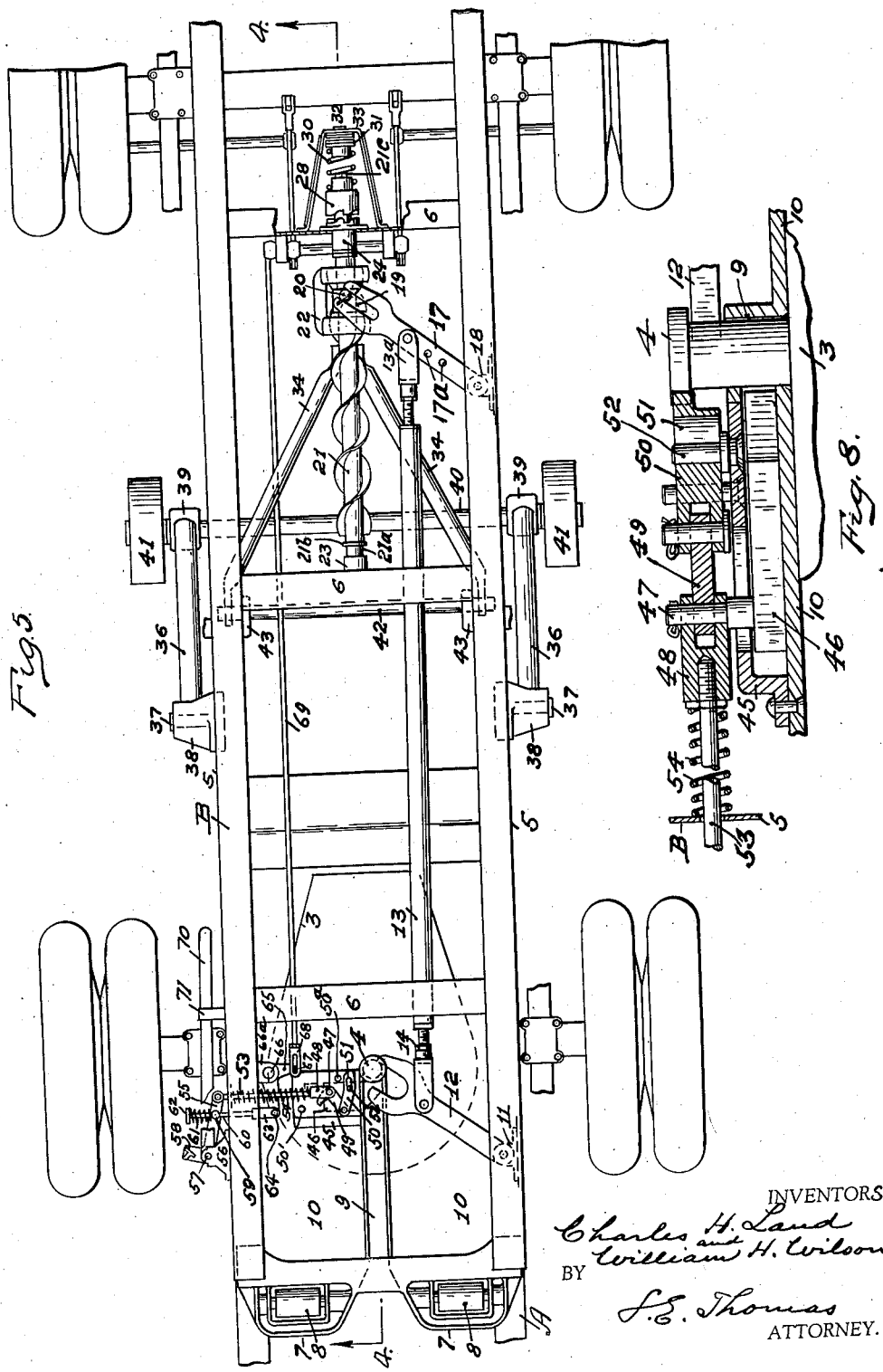

Patented Jan. 21, 1936

2,028,400

UNITED STATES PATENT OFFICE 2,028,400

TRACTOR-TRAILER VEHICLE

Charles H. Land and William H. Wilson, Detroit, Mich.; said Land assignor to said Wilson Application April 15, 1935, Serial No. 16,398

10 Claims. (Cl. 280—33.1)

Our invention relates to tractor-trailer vehicles and its primary object is to provide an improved apparatus whereby the landing gear is operated automatically to a supporting or to a transit position only when the king-pin is in absolute engagement with the actuating member of the landing gear.

We secure this object in the apparatus illustrated in the accompanying drawings in which:—

Figure 1 is a sectional elevation taken on or. about line 1—1 of Figure 2, the parts being shown in their position at the commencement of the coupling operation.

Figure 2 is a plan view, the parts being in the position which directly follows the commencement of the coupling operation.

Figure 3 is a detail sectional elevation on an enlarged scale, taken on or about line 3—3, of Figure 1.

Figure 4 is a sectional elevation taken on or about line 4—4, of Figure 5,—the parts being shown in their coupled position.

Figure 5 is a plan view,—the parts being shown in position indicated in Figure 4.

Figure 6 is a detail sectional view on an enlarged scale, taken on or about line 6—6, of Figure 2.

Figure 7 is a detail plan view, showing on an enlarged scale, the king-pin locking and releasing mechanism and its connection to the brake setting apparatus.

Figure 8 is a detail section of the lock casting 45, taken substantially through the pins 47 and 52.

Reference is made to U. S. Patent No. 1,686,698 granted to Charles H. Land, May 4, 1927 as showing the type of apparatus to which our present construction relates.

A, denotes a tractor with a ramp plate 1 secured to its frame. The numeral 2 indicates a pedestal bolted to the side sills of the tractor and supporting a rocking fifth wheel 3. The numeral 4, designates a king-bolt, projecting upwardly from the fifth wheel 3, provided with a circular flange of greater diameter than said bolt, around its upper end.

B, designates a trailer with commonly used drop side sills 5, 5, and cross members 6 bolted or riveted thereto. 7, 7, indicate skid castings riveted to the front cross member of the frame and equipped with rollers 8, 8. Said castings form a wide flaring approach to the throat 9 of the trailer. 10, 10, denote wear plates spaced apart at the center and riveted on the under side of the sills and cross members. These plates form the upper fifth wheel,—their edges being turned up at the center to form a throat 9, and guide surfaces for the king-pin, and for constraining the motion of the king-pin during the coupling and uncoupling operation.

11, designates a bearing bracket riveted to a side sill. 12, denotes a horizontal lever arm, pivoted in the bracket 11 at its outer end, and having a forked inner end extending over the throat 9 of the trailer, adapted to engage the king-pin or bolt 4 of the tractor. The king-pin or bolt, is absolutely engaged between the branches of the fork of the lever 12, and the side walls of the throat 9, throughout the coupling and uncoupling operation.

18, indicates a bearing bracket riveted to a side sill. 17 denotes a horizontal lever arm, pivoted in the bracket 18 at its outer end to swing in substantially the same plane as the lever arm 12 and having a forked inner end adjacent to the center line of the frame of the trailer.

13, is a connecting rod preferably tubular in construction yoked and pinned at its ends to the lever arms 12, and 17, near the inner ends of said arms. Means for adjustment is provided by a nut 14 and the threaded end of a stub shaft 15, welded to the tube 13. The tube 13 passes and slides through slots in two cross members 6, 6, and at its rear end is bent downward to connect by an adjustable yoke 13a with the lever arm 17, through any of a plurality of holes 17a, in the lever arm.

21, denotes a shaft centrally located between and parallel to the sills 5, 5, and toward the rear of the frame,—having double helical exterior threads of relatively long pitch. The shaft 21 is supported in bearings 23 and 24 in the cross members 6, 6, and is rotatable and to a limited extent longitudinally slidable, in said bearings. 21b is a thrust washer at the end 21a of the shaft 21, that limits the forward movement of said shaft in uncoupling.

22 is a head adapted to travel longitudinally upon the shaft 21, having internal helical slots to receive the exterior threads of said shaft.

19, is a nut meshing with the double threads of the shaft 21, centrally spaced in the traveling head 22, and provided with oppositely extending trunnions 20, 20. The forked yoked inner end of the lever arm 17 engages said trunnions.

The traveling head 22 has a downwardly projecting lug at its forward end to which the leg arms 34, 34, are connected by a pivot pin 35.

At the rear end of the shaft 21, there is a square end 21c which meshes with a movable clutch head 28. Further forward on said shaft is turned a cylindrical bearing 29 (Figure 3) of a diameter greater than the diagonals of the adjacent squared portion and of sufficient length to extend through the bearing 24 and into the movable clutch 28. The bearing 24 consists of a casting having its front cylindrical end, extending through the cross member 6 and bored to receive the cylindrical end of the shaft 21. Its rear end is equipped with teeth and said casting forms the stationary clutch member with which the teeth of the movable clutch member 28 engage.

The clutch 28 is pressed forward and toward the stationary clutch member 24 by a helical spring 30, the rear end of which bears on thrust washer 31 (Figure 3) fitted to a cylindrical casting 32, on a bracket bolted to the cross member 6 (Figure 2).

Two leg members 36, 36, are pivoted by pins 37, 37, to castings 38, 38, riveted to the outside of the side sills, 5, 5. At the lower end of the leg members are adjustable castings 39, 39, which clamp to the axle 40. The axle carries wheels 41, 41. The leg members are also tied together by a cross bar 42 which is clamped to castings 43, 43. The leg arms 34, 34, are pivotally connected to the bar 42 at their lower ends. A casting 45, (Figure 7) is riveted to a plate 10, and forms a casing in which reciprocates a bolt or latch 46, so that the end of said bolt may project across the throat 9, or be withdrawn therefrom. A pin 47, (see Figure 8) pressed into the latch bar 46 projects through a slot in the top of the casting 45. To this pin a yoke 48 and one end of a toggle link 49, are pivotally attached. A link 50 is pivotally connected at one end to the free end of the link 49. The link 50 has a slot 51 toward its other end through which projects a pin 52 the lower end of which is fixed to the casting 45. Attached to yoke 48 is a pull bar 53 carrying a coil spring 54 and pivotally connected to lever 55. Lever 55 is pivotally connected to casting 56 by a pin 57; and at one end carries a contact lug 58. From an upper face of lever 55 projects a lug 59 which is transversely bored. 60 is a connecting rod slidably passing through said transverse bore and provided with a relief spring 61 and an adjusting nut 62 at its outer end. At the other end the rod 60 is pivotally attached by a yoke 63 and pin 64 to a bell-crank lever 65, pivoted by a pin 66 to a casting 66a. The other end of the lever 65 is connected to a brake rod 69 by a pin 67 passing through slots in the yoke end of the brake rod 69, which connects through the usual linkage to the rear axle brakes. A hand lever 70 is pivoted to the bracket 56. A spring clip 71 fastened to the trailer frame holds the lever 70 when in inoperative position.

The operation of the above described device is as follows:—

Assume that the trailer is coupled to the tractor and it is desired to release or uncouple them.

The lever 12 would be in the position shown in Figure 5, and also the latch 46, and links 49 and 50. The lever 70 is manually released from the clip 71 and turned outwardly until it contacts the lug 58 of the lever 55, and turns said lever drawing the latch bar 46 from across the throat 9 by means of the rod 53 and releasing the king bolt 4.

The toggle links 49 and 50 are straightened out and are cammed or forced past a dead center by pin 50¹ until their motion is arrested by a stop pin 50a (Figure 7). The latch bar is thus prevented from returning to a locked position, and holds the brake "set".

In the above operation the turning of the lever 55, actuates the lever 65 through the connecting rod 60 and sets the parking brakes through the rod 69. The lever 70 can now be returned to its out-of-the-way position in engagement with the spring clip 71.

As the tractor is drawn away from the trailer the flange of the king-pin or bolt 4 strikes the end of the slotted toggle link 50, and presses it out of its path. This only gives a little more brake set, while the latch still remains in an unlocked position. On coupling the tractor to the trailer the flange of the king-pin or bolt hits the end of the toggle link 50, and turns it about pin 52, and thereby breaks the locking angle between the two links. This allows the latch bar 46, to engage the king bolt 4, and releases the parking brakes.

On coupling the tractor to the trailer, the open forked end of the lever 12 receives the neck of the king-pin or bolt 4, of the tractor (Figure 2) and remains in engagement with it to effect the locking of the king-pin to the trailer (Figure 5).

The movement of the lever arm 12 is transmitted to the lever arm 17, through the connecting rod 13. The arm 17 actuates the nut 19 by its forked and yoked end engaging the trunnions 20, 20. The first part of the movement of the nut 19 carries the shaft 21 along with it disengaging the clutch member 28, from the clutch member 24. The further movement of the nut 19 rotates the shaft 21, through its helical threads, which acting upon the head 22, 22, through said threads, draws the supporting legs 36, 36, to the position shown in Figure 4.

When the head 22, 22, and nut 19 return to their forward position, the shaft 21 is rotated in a clockwise direction in which direction the clutch members 28—24 permit relative substantially free movement.

It will be noticed that should the coupling be incomplete and the tractor draw away from the trailer the uncoupling motion will positively actuate the landing gear into supporting position as the king pin 4 engages the fork of the lever 12 until the landing gear is in operative position.

The nut 19 and head 22, may be considered as one part and the head may be operated directly from the link 17 if desired, the nut being omitted.

Having thus described our invention, what we claim is:—

1. In a tractor-trailer vehicle, a swinging lever arm forked at one end and pivoted to the trailer frame, adapted to receive a king-pin carried by the tractor, whereby upon backing the tractor into the trailer the king-pin carried by the tractor may engage the forked end of the swinging lever arm to actuate a landing gear; and a landing gear carried by the trailer, adapted to support the latter when actuated through the operation of the swinging lever arm.

2. In a tractor-trailer vehicle, the combination of an adjustable landing gear; a swinging lever arm pivoted to the trailer frame, having a forked end adapted to overlap a longitudinal throat in the trailer frame, to receive the thrust of a king-pin carried by the tractor; a helical shaft; a traveling head having helical threads engaging the threads of the helical shaft; a swinging lever-arm pivoted to the frame of the trailer and operably connected with the traveling head, in turn connected with the landing gear; and a rod linking the swinging lever arms together; whereby upon coupling, and on uncoupling the tractor and trailer the traveling head is actuated to raise or lower the landing gear, and to maintain the latter in its adjusted position.

3. In a tractor-trailer apparatus, the combination of a frame; a coupling and uncoupling device at the front of said frame; a shaft located at the rear of said frame having a helical thread thereon extending longitudinally of said frame; a head adapted to reciprocate upon said shaft, engaging the threads of said shaft, said head being connected with the landing gear; a part at the front of said frame adapted to be reciprocated in a direction longitudinal of said frame, by the coupling and uncoupling; a part adapted to reciprocate longitudinal of said frame at the rear thereof and connected to said head, said reciprocating parts being coupled together by a connecting rod.

4. In a tractor-trailer apparatus, the combination of a frame; a coupling and uncoupling device at the front of said frame; a shaft located at the rear of said frame having a helical thread thereon extending longitudinally of said frame; a head adapted to reciprocate upon said shaft and engaging the threads of said shaft, said head being connected with the landing gear; a part at the front of said frame adapted to be reciprocated in a direction longitudinal of said frame, by the coupling and uncoupling; a part adapted to reciprocate longitudinal of said frame at the rear thereof and connected to said head said reciprocating parts being coupled directly together.

5. In a tractor-trailer apparatus, the combination of a frame, a coupling and uncoupling device at the front of said frame a shaft located at the rear of said frame extending longitudinally of said frame and having helical threads thereon; a head adapted to reciprocate upon said shaft and engaging the threads of said shaft, said head being connected with a landing gear; a swinging link at the front of said frame adapted to be oscillated by the coupling and uncoupling; a swinging link at the rear of said frame engaging said head at the end remote from its pivot, said swinging links being connected directly together.

6. In a tractor-trailer apparatus the combination of a part on said trailer having a substantially straightguide throat for the coupling pin of the tractor; a lever arm pivoted at one end and having its other end forked and adapted to swing over said throat so that the open end of said fork shall register with said throat to receive said pin at an end of its travel and the branches of said fork shall extend across said throat during the rest of its travel; a landing gear, said lever arm being connected to said landing gear to operate the same.

7. In a tractor-trailer vehicle; a landing gear; a king-pin carried by the tractor; a swinging lever arm forked at one end pivoted to the trailer frame, adapted to receive in sliding engagement the king-pin carried by the tractor, whereby upon backing the tractor into the trailer, the king-pin carried by the tractor may engage the forked end of the swinging lever arm to actuate the landing gear into or out of action; and an automatic locking means independent of the swinging lever for locking the tractor to the trailer, whereby there may be no draft of the tractor applied to the swinging lever arm while in transit.

8. In a tractor-trailer apparatus; a landing gear; a trailer frame; a coupling and uncoupling device at the front of the trailer frame; a guide located at the rear of said frame extending longitudinally of said frame; a head adapted to reciprocate upon said guide, said head being connected with the landing gear; a swinging member pivoted to the front end of said frame; adapted to be actuated in a direction longitudinally of the frame by the coupling and uncoupling operation of the tractor and trailer; a swinging member pivoted to the rear of said frame, connected with the reciprocal head; and a rod connecting the swinging members at the front and rear of the frame, whereby the landing gear may be actuated by the coupling and uncoupling operation of the tractor-trailer.

9. In a tractor-trailer apparatus, the combination of a frame; a landing gear; a coupling and uncoupling device at the front of said frame; a shaft located at the rear of said frame extending longitudinally of said frame; a head adapted to reciprocate on said shaft connected to the landing gear; a swinging member pivoted at the front end of said frame, adapted to be oscillated by the coupling and uncoupling of the tractor-trailer; a swinging member pivoted at the rear of said frame engaging said head at the end remote from the pivot of the swinging member; and means for connecting said swinging members directly together.

10. In a tractor-trailer vehicle, the combination of a trailer frame; an adjustable landing gear carried by the trailer frame; a king-pin carried by the tractor; a swinging lever arm pivoted to the forward end of the trailer frame, having a forked end adapted to overlap a longitudinal throat in the trailer frame, to receive the thrust of the king-pin carried by the tractor; a swinging lever arm pivoted to the rear of the trailer frame; means connecting the adjustable landing gear with the last named swinging lever arm; means for operatively linking the lever arms together, whereby the landing gear may be shifted into or out of action; and an automatic locking means independent of the swinging lever arm, for locking the tractor to the trailer, whereby there may be no draft of the tractor applied to the swinging lever arm while in transit.

CHARLES H. LAND.
WILLIAM H. WILSON.